United States Patent
Jo et al.

(10) Patent No.: US 11,453,244 B2
(45) Date of Patent: Sep. 27, 2022

(54) TYRE FOR A MOTORCYCLE

(71) Applicant: Sumitomo Rubber Industries, Ltd., Hyogo (JP)

(72) Inventors: Hiroshi Jo, Hyogo (JP); Yohei Maeda, Hyogo (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 306 days.

(21) Appl. No.: 16/237,904

(22) Filed: Jan. 2, 2019

(65) Prior Publication Data

US 2019/0225024 A1 Jul. 25, 2019

(30) Foreign Application Priority Data

Jan. 25, 2018 (JP) .............................. JP2018-010749

(51) Int. Cl.
  B60C 11/03 (2006.01)
  B60C 11/01 (2006.01)
  B60C 11/00 (2006.01)

(52) U.S. Cl.
  CPC .......... B60C 11/0304 (2013.01); B60C 11/01 (2013.01); B60C 11/0302 (2013.01); B60C 11/0332 (2013.01); B60C 11/0083 (2013.01); B60C 11/033 (2013.01); B60C 11/0316 (2013.01); B60C 2011/0346 (2013.01); B60C 2011/0353 (2013.01); B60C 2011/0355 (2013.01); B60C 2011/0358 (2013.01); B60C 2200/10 (2013.01)

(58) Field of Classification Search
  CPC ... B60C 11/01; B60C 11/0304; B60C 11/032; B60C 13/02; B60C 11/0302
  See application file for complete search history.

(56) References Cited

U.S. PATENT DOCUMENTS

| | | | |
|---|---|---|---|
| 2013/0014869 A1* | 1/2013 | Makioka | B60C 11/0302 152/209.11 |
| 2014/0305560 A1* | 10/2014 | Matsunami | B60C 11/033 152/209.11 |
| 2015/0360520 A1* | 12/2015 | Ito | B60C 15/0036 152/523 |
| 2018/0170119 A1* | 6/2018 | Sato | B60C 13/02 |
| 2018/0304694 A1* | 10/2018 | Misani | B60C 11/033 |

FOREIGN PATENT DOCUMENTS

| | | | | |
|---|---|---|---|---|
| JP | 59220405 A | * | 12/1984 | ............. B60C 11/11 |
| JP | 2010163144 A | * | 7/2010 | ......... B60C 11/1376 |
| JP | 5632233 B2 | | 11/2014 | |

* cited by examiner

Primary Examiner — Timothy Kennedy
Assistant Examiner — Farah Taufiq
(74) Attorney, Agent, or Firm — Studebaker & Brackett PC

(57) ABSTRACT

A tyre 1 for a motorcycle comprises a tread portion 2 and a pair of sidewall portions 3 connected with both ends of the tread portion 2 and extending inwardly in a tyre radial direction. A connecting portion 9 of the tread portion 2 and at least one of the pair of the sidewall portions 3 is provided with a plurality of protruding portions 10 each protruding outwardly in a tyre axial direction. The plurality of the protruding portions 10 is arranged in a tyre circumferential direction with a space 11 between each other.

19 Claims, 5 Drawing Sheets

TYRE FOR A MOTORCYCLE

TECHNICAL FIELD

The present invention relates to a tyre for a motorcycle.

BACKGROUND ART

Cornering of a motorcycle mainly carried out by an operation of leaning the vehicle body to the left or right by the rider (hereinafter referred to as "roll"). At this time, if the rider leans the motorcycle too much such as in full-bank running, it may lead to falling of the vehicle body and so on, therefore, there has been a demand for the tyre as well that the rider can easily recognize the limit of the roll.

For example, it may be a solution for the above issue to increase rigidity of regions of the tyre on sides of tread edges by, for example, providing a reinforcing rubber layer in sidewall portions of the tyre so as to feedback large reaction force (the reaction force that hinders the roll) to the rider during full-bank running.

However, in the tyre having merely increased rigidity in the regions of the tyre on the sides of the tread edges, deformation in these regions becomes small, therefore, it is possible that ground contacting feeling is deteriorated not only during normal straightaway driving but also during full-bank running.

SUMMARY OF THE INVENTION

The present invention was made in view of the above, and a primary object thereof is to provide a tyre for a motorcycle having improved stability performance during full-bank running.

In one aspect of the present invention, a tyre for a motorcycle comprises a tread portion and a pair of sidewall portions connected with both ends of the tread portion and extending inwardly in a tyre radial direction, wherein a connecting portion of the tread portion and at least one of the pair of the sidewall portions is provided with a plurality of protruding portions each protruding outwardly in a tyre axial direction, and the plurality of the protruding portions is arranged in a tyre circumferential direction with a space between each other.

In another aspect of the invention, it is preferred that the tread portion is provided with grooves each extending so as to intersect with the connecting portion.

In another aspect of the invention, it is preferred that each space is formed by a respective one of the grooves.

In another aspect of the invention, it is preferred that a cross-sectional area of each of the grooves at a position of the connecting portion is in a range of from 10 to 30 sq. mm.

In another aspect of the invention, it is preferred that a length in the tyre circumferential direction of each space is in a range of from 3 to 10 mm.

In another aspect of the invention, it is preferred that a length in the tyre circumferential direction of each space is less than 10% of a maximum length of a foot print when the tyre is mounted on a standard rim, inflated to a standard inner pressure, and in contact with a flat surface with a camber angle of 45 degrees by being loaded with a standard tyre load.

In another aspect of the invention, it is preferred that when a tread development width is divided equally into four, the tread portion includes a pair of shoulder regions positioned on both ends, and a land ratio of each of the shoulder regions is not less than 70%.

In another aspect of the invention, it is preferred that the tread portion includes a crown region defined between the pair of the shoulder regions, and the land ratio of each of the shoulder regions is larger than the land ratio of the crown region.

DESCRIPTION OF THE PREFERRED EMBODIMENT

An embodiment of the present invention will now be described below in detail in conjunction with accompanying drawings.

Figure 1:
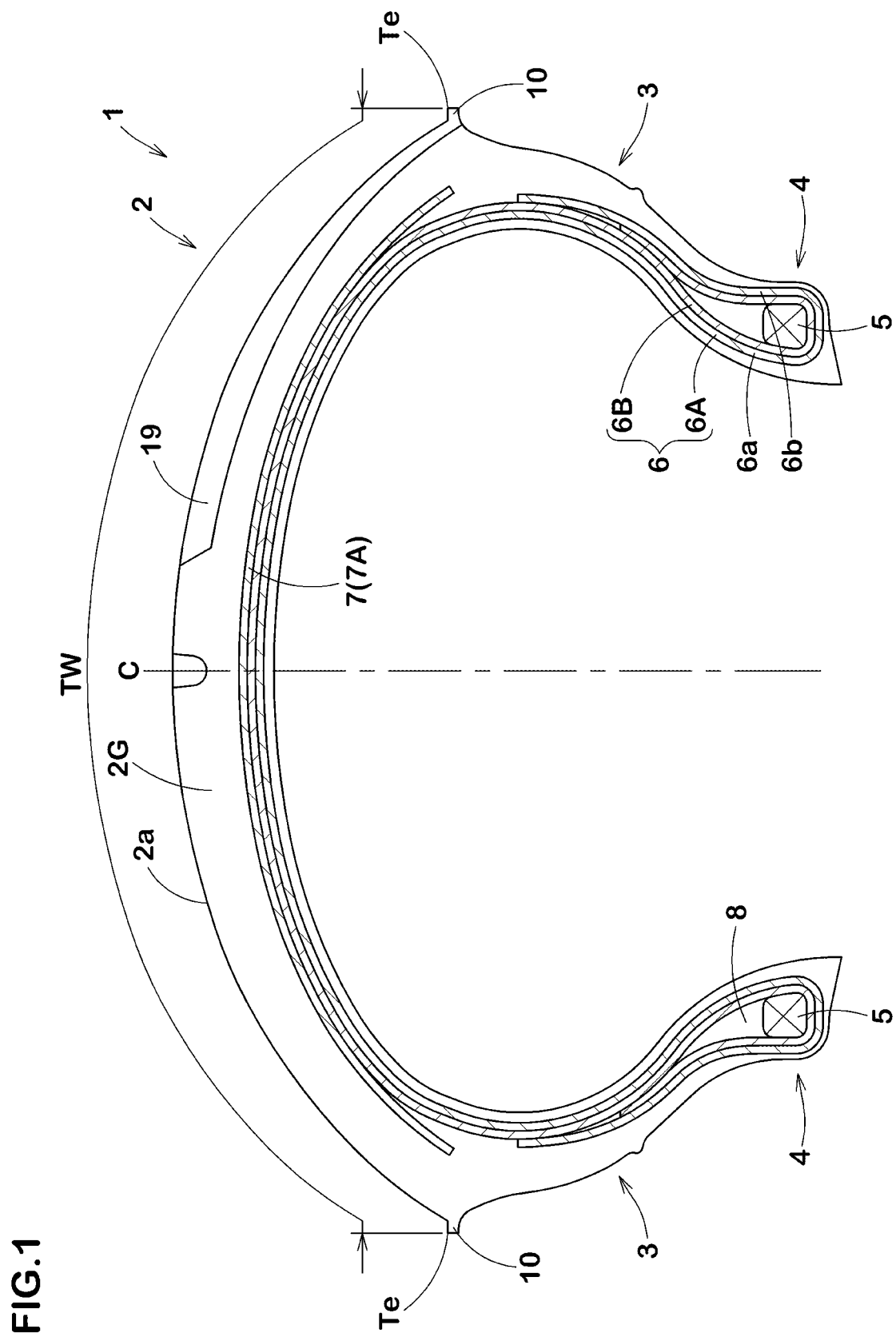
FIG. 1 is a cross-sectional view of a tyre for a motorcycle according to an embodiment of the present invention.

FIG. 1 is a tyre meridian section of a tyre 1 for a motorcycle (hereinafter, may be simply referred to as "tyre 1") in a standard state passing through a tyre rotational axis thereof. The "standard state" is a state in which the tyre is mounted on a standard rim, inflated to a standard inner pressure, and loaded with no tyre load. In this specification, dimensions and the like of various parts of the tyre 1 are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The tyre 1 includes a tread portion 2, a pair of sidewall portions 3 each connected with a respective end in the tyre axial direction of the tread portion 2 and extending inwardly therefrom in a tyre radial direction, and a pair of bead portions 4 each connected with a respective one of the sidewall portions 3 and extending radially inwardly therefrom.

The tread portion 2 is formed such that a ground contacting surface (2a) between tread edges (Te) of the tread portion 2 is curved in an arc shape (not shown) convex toward an outer side in the tyre radial direction so that a sufficient ground contacting area can be obtained even during cornering with a large camber angle. A development length of the ground contacting surface (2a) between the tread edges (Te) is defined as a tread development width (TW).

As shown in FIG. 1, the tyre 1 in this embodiment includes a carcass 6 extending between bead cores 5 of the bead portions 4 via the tread portion 2 and the sidewall portions 3, and a tread reinforcing layer 7 disposed on an outer side in the tyre radial direction of the carcass 6 and inside of the tread portion 2.

The carcass 6 in this embodiment is composed of two carcass plies 6A and 6B. Each of the carcass plies 6A and 6B includes a main body portion (6a) extending between the bead cores 5 in a toroidal manner and turned up portions (6b) each turned up around a respective one of the bead cores 5. Between each of the main body portion (6a) and its adjacent one of the turned up portions (6b), a bead apex rubber 8 for reinforcing the bead portion extending outwardly in the tyre radial direction from a respective one of the bead cores 5 is arranged, for example.

The tread reinforcing layer 7 is formed of at least one belt ply 7A, two belt plies 7A in this embodiment, in which belt cords made of steel cords, for example, are arranged at an angle in a range of from 5 to 40 degrees, for example, with respect to a tyre equator (C). A tread rubber 2G forming the ground contacting surface (2a) of the tyre 1 is arranged on an outer side in the tyre radial direction of the tread reinforcing layer 7.

Figure 2:
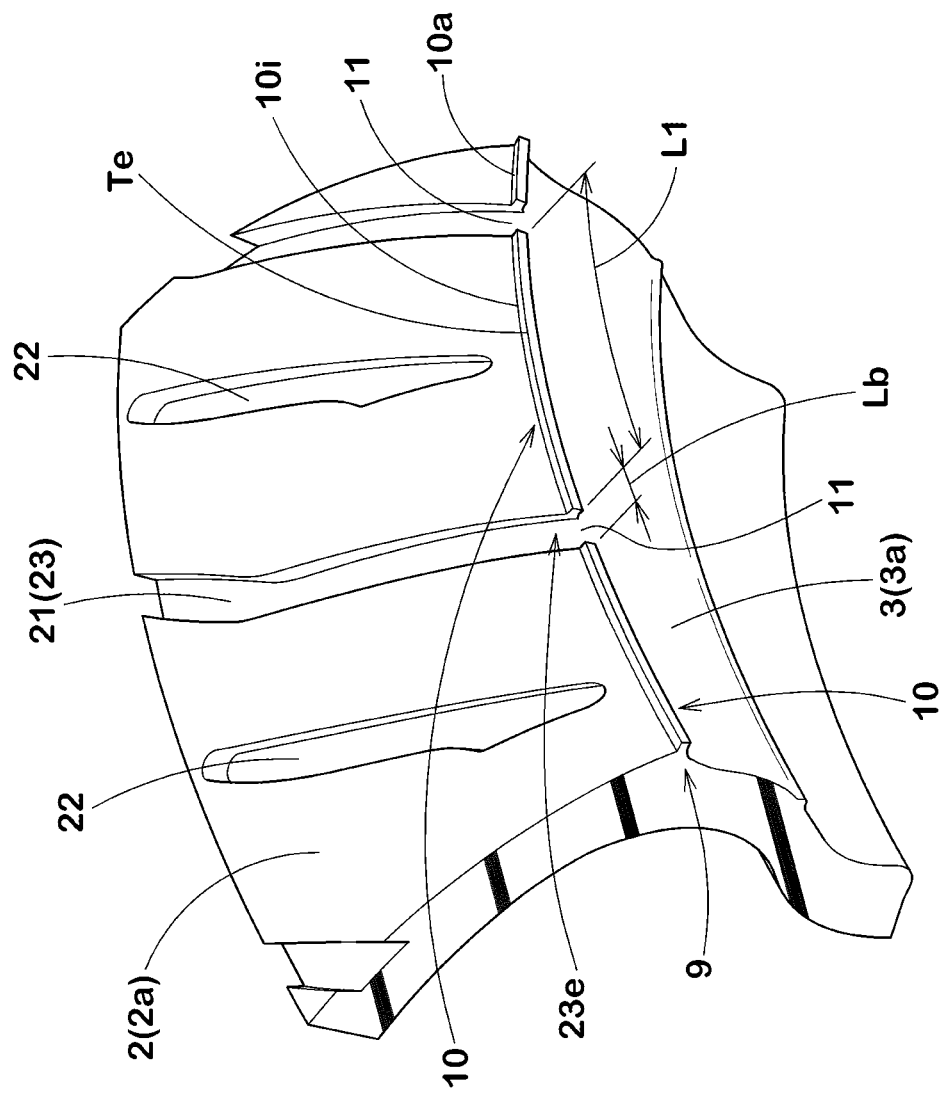
FIG. 2 is a cross-sectional perspective view of the tyre of FIG. 1.

FIG. 2 is a cross-sectional perspective view of the tyre 1. As shown in FIG. 2, the tyre 1 is provided with connecting portions 9 each connecting between the tread portion 2 and a respective one of the sidewall portions 3. Each of the connecting portions 9 in this embodiment is formed so as to be continuous in a tyre circumferential direction. The connecting portions 9 in this embodiment are formed on both sides, one on each side, in a tyre axial direction of the tread portion 2.

At least one, each in this embodiment, of the connecting portions 9 in this embodiment is provided with protruding portions 10 each protruding outwardly in the tyre axial direction. A plurality of the protruding portions 10 in this embodiment is arranged in the tyre circumferential direction with a space 11 between each other. The protruding portions 10 collide with the road surface during full-bank running, therefore, it is possible that the rider recognizes the limit of the roll by the resistance (the reaction force). The plurality of the protruding portions 10 arranged in the tyre circumferential direction with the space 11 between each other suppress excessive increase in the rigidity of the regions on the sides of the tread edges, therefore, deterioration of the ground contacting feeling due to having the protruding portions 10 is suppressed. Thereby, the tyre 1 in this embodiment has excellent stability performance during full-bank running.

Especially, with tyres having good transient characteristics, it is difficult to recognize the limit of the roll. Thereby, as in this embodiment, the tyre 1 in which a plurality of the protruding portions 10 and a plurality of the spaces 11 are provided in the connecting portions 9 is suitably used for a tyre 1 having good transient characteristics, for example, for racing. In this specification, "good transient characteristics" means that response to leaning of the vehicle body is linear from the early stage of the roll to the end stage of the roll.

The protruding portions 10 and the spaces 11 in this embodiment are arranged alternately in the tyre circumferential direction. It is preferred that the protruding portions 10 are arranged at equal pitches in the tyre circumferential direction. Thereby, excessive increase of the rigidity is further suppressed, therefore, the deterioration of the ground contacting feeling is suitably suppressed.

Figure 3:
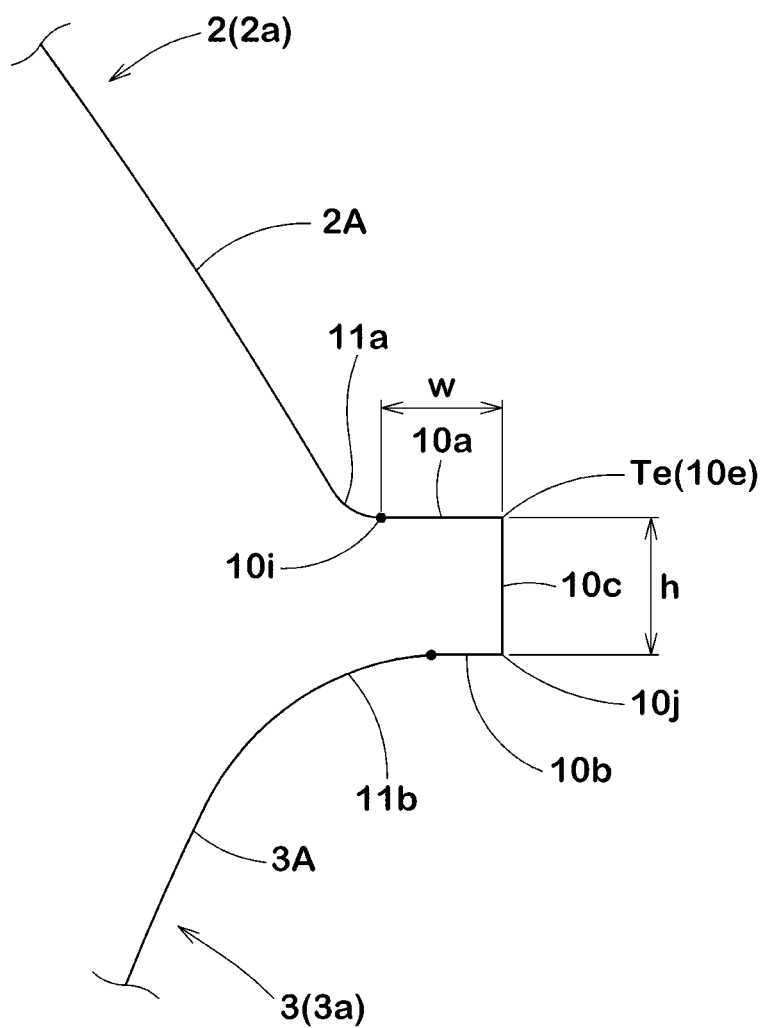
FIG. 3 is an enlarged view of one of protruding portions of FIG. 1.

FIG. 3 is an enlarged view of one of the protruding portions 10 of FIG. 1. As shown in FIG. 3, each of the protruding portions 10 in this embodiment is formed in a rectangular shape in the tyre meridian section. Each of the protruding portions 10 includes an outer surface (10a), an inner surface (10b), and an outward facing surface (10c) connecting between the outer surface (10a) and the inner surface (10b), for example. The outer surface (10a) is formed of a portion of the ground contacting surface (2a) of the tread portion 2 and extends in the tyre axial direction. The inner surface (10b) is formed of a portion of an outer surface (3a) of a respective one of the sidewall portions 3 and extends in the tyre axial direction. In this embodiment, an outer end (10e) in the tyre axial direction of the outer surface (10a) forms a respective one of the tread edges (Te).

The outer surface (10a) in this embodiment is connected with a main portion 2A of the ground contacting surface (2a) configured to be smoothly convex outwardly in the tyre radial direction with a first arc portion (11a) that is convex inwardly in the tyre radial direction therebetween. The inner surface (10b) in this embodiment is connected with a main portion 3A of the outer surface (3a) extending smoothly in the tyre radial direction with a second arc portion (11b) that is convex outwardly in the tyre radial direction therebetween. The outer surfaces (10a) and the inner surfaces (10b) configured as such increase the rigidity of the protruding portions 10, therefore, it is possible to allow the rider to recognize the limit of the roll more reliably.

It is preferred that a radius of curvature (r2) of the second arc portion (11b) is larger than a radius of curvature (r1) of the first arc portion (11a). Thereby, the rigidity of each of the protruding portions 10 on a side of a respective one of the second arc portions (11b) to which large compressive force is applied during the full-bank running, therefore, it is possible that large reaction force is obtained from the road surface. From such a point of view, it is preferred that the radius of curvature (r1) of the first arc portion (11a) is not more than 2 mm, for example. Further, the radius of curvature (r2) of the second arc portion (11b) is preferably more than 2 mm, more preferably in the range of from 3 to 5 mm.

The outer surface (10a), the inner surface (10b), and the outward facing surface (10c) in this embodiment are formed in a straight shape. However, they are not limited to such an embodiment, and each of the outer surface (10a), the inner surface (10b), and the outward facing surface (10c) may be formed in an arc shape, for example. Further, the outer surface (10a) may be connected with the main portion 2A of the ground contacting surface (2a) without having the first arc portion (11a) therebetween.

It is preferred that a width (w) in the tyre axial direction of each of the protruding portions 10 is in the range of from 1 to 2 mm. If the width (w) of each of the protruding portions 10 is less than 1 mm, the rigidity of regions of the tyre on the sides of tread edges cannot be increased, therefore, it is possible that the reaction force to be fed back to the rider during the full-bank running becomes small. Further, if the width (w) of each of the protruding portions 10 is more than 2 mm, the reaction force from one of the protruding portions 10 becomes drastically large during the full-bank running, therefore, the deformation of the regions of the tyre on the sides of the tread edges becomes small, thereby, the ground contacting feeling is rather deteriorated, therefore, it is possible that the stability performance during the full-bank running is deteriorated. The width (w) in the tyre axial direction of each of the protruding portions 10 is a length between an inner end (10i) of the outer surface (10a) and an outer end in the tyre axial direction of a respective one of the protruding portions 10.

From a point of view of improving the stability performance during the full-bank running, it is preferred that a height (h) in the tyre radial direction of each of the protruding portions 10 is in the range of from 1 to 2 mm. The height (h) in the tyre radial direction of each of the protruding portions 10 is a distance between the outer end (10e) in the tyre axial direction of the outer surface (10a) and an outer end (10j) in the tyre axial direction of the inner surface (10b). It is preferred that a length L1 (shown in FIG. 2) in the tyre circumferential direction of each of the protruding portions 10 is in the range of from 20 to 100 mm.

Figure 4:
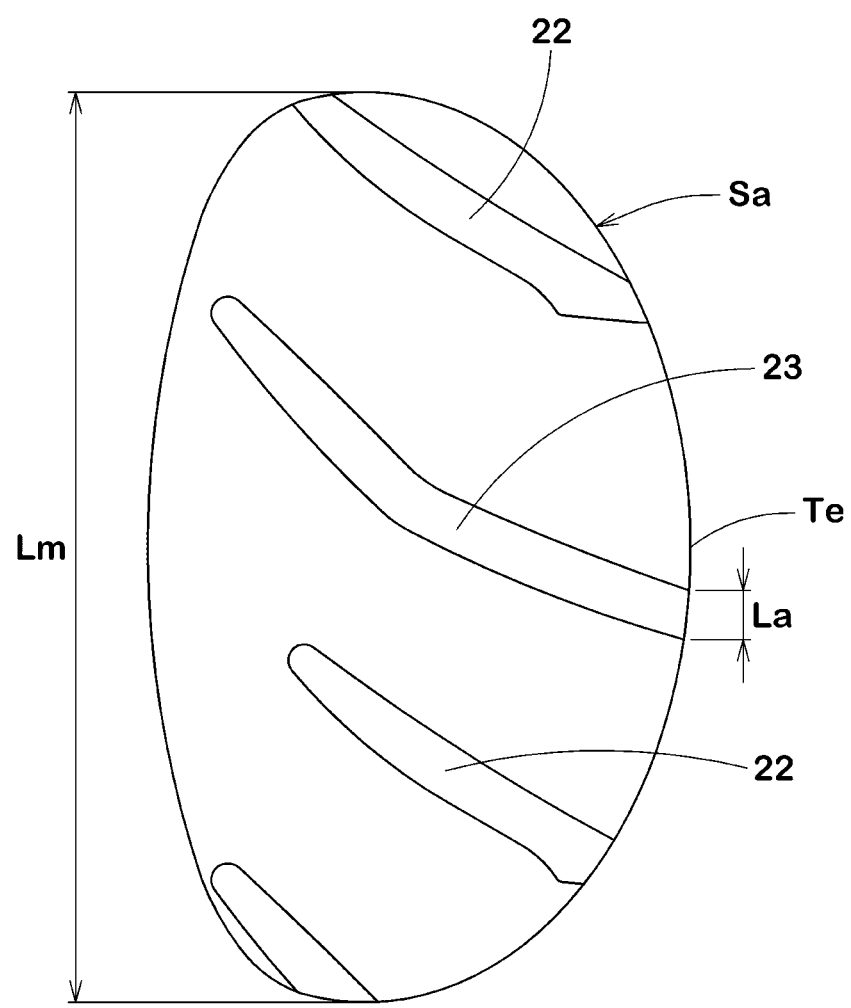
FIG. 4 is a diagram of a foot print of the tyre of FIG. 1 during full-bank running.

FIG. 4 is a diagram of a foot print (sa) of the tyre 1 when the tyre 1 in the standard state is in contact with a flat surface with the camber angle of 45 degrees by being loaded with a standard tyre load. As shown in FIG. 4, it is preferred that a length (La) in the tyre circumferential direction of each of the spaces 11 is less than 10% of a maximum length (Lm) of the foot print (sa). If the length (La) in the tyre circumferential direction of each of the spaces 11 is not less than 10% of the maximum length (Lm) of the foot print (sa), the rigidity in the regions of the tyre on the sides of the tread edges is excessively decreased, therefore, it is possible that the reaction force to be fed back to the rider during the full-bank running becomes small. Note that if the length (La) in the tyre circumferential direction of each of the spaces 11 is small, the deformation of the regions of the tyre on the sides of the tread edges becomes small, therefore, it is possible that the ground contacting feeling is deteriorated. Thereby, it is preferred that the length (La) in the tyre circumferential direction of each of the spaces 11 is not less than 4% of the maximum length (Lm) of the foot print (Sa).

The "standard tyre load" is a tyre load specified for the concerned tyre by a standard included in a standardization system on which the tyre 1 is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

From the similar point of view, it is preferred that a length (Lb) (shown in FIG. 2) in the tyre circumferential direction of each of the spaces 11 is in the range of from 3 to 10 mm.

Figure 5:
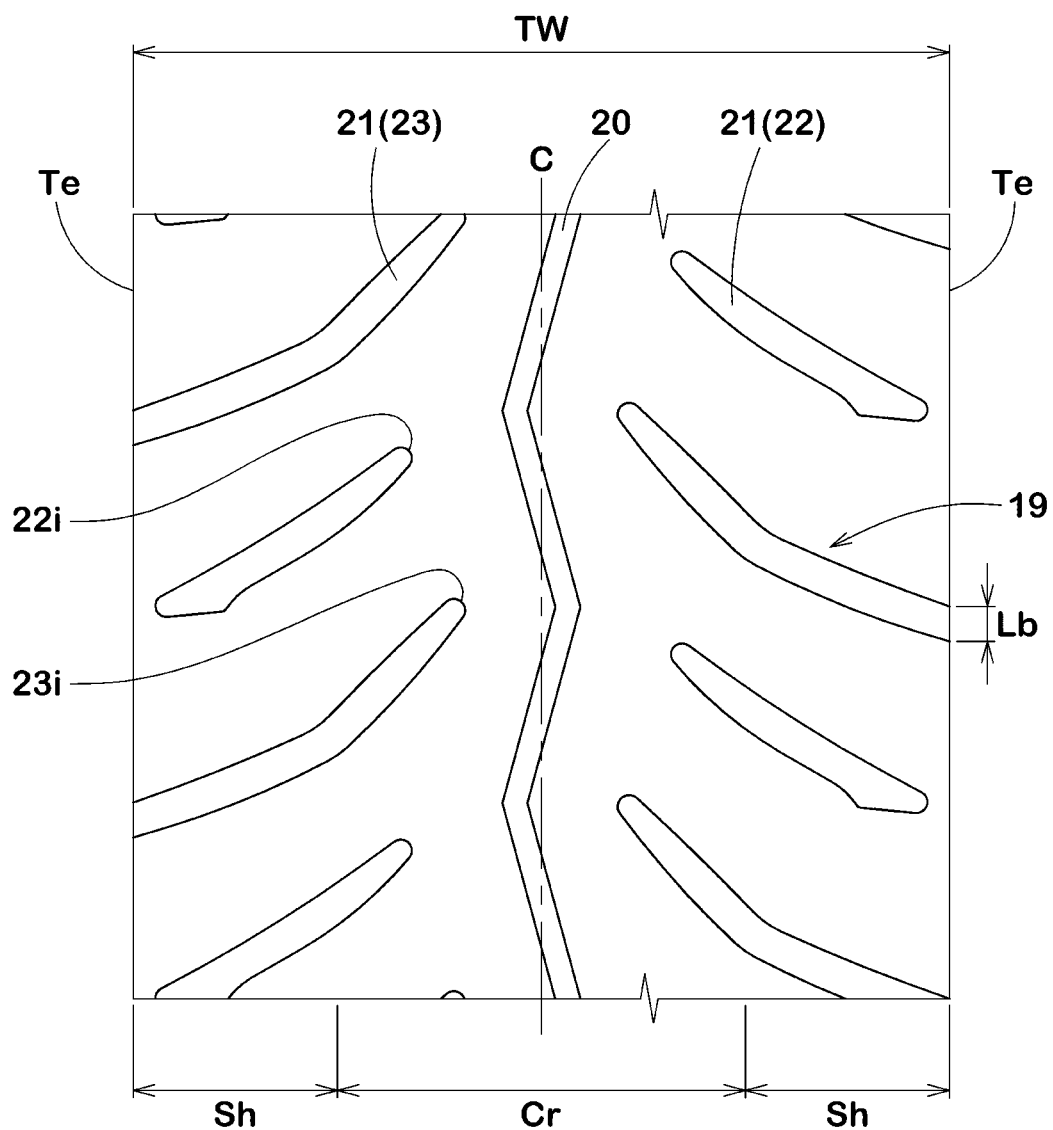
FIG. 5 is a development view of the tread portion of FIG. 1.

FIG. 5 is a development view of the tread portion 2 in this embodiment. As shown in FIG. 5, when the tread development width (TW) is divided equally into four, the tread portion 2 includes a pair of shoulder regions (Sh) positioned on both ends and a crown region (Cr) sandwiched between the pair of the shoulder regions (sh).

It is preferred that a land ratio of each of the shoulder regions (sh) is not less than 70%. Thereby, the rigidity of the region which contacts with the ground is maintained high, therefore, large deformation of the protruding portions 10 during the full-bank running is suppressed. Thereby, it becomes easy for the rider to recognize the limit of the roll. Note that if the land ratio of any one of the shoulder regions (sh) is more than 80%, the rigidity of the regions of the tyre on the sides of the tread edges becomes excessively large, therefore, it is possible that the ground contacting feeling is deteriorated during the full-bank running. Thereby, it is preferred that the land ratio of each of the shoulder regions (sh) is not more than 80%. The land ratio is a ratio between a surface area of the ground contacting surface and a surface area of an imaginary ground contacting surface obtained by filling all the groove-like bodies of the tread portion 2.

It is preferred that the land ratio of each of the shoulder regions (sh) is larger than the land ratio of the crown region (Cr). Thereby, the shoulder regions (sh) are formed to have greater rigidity than the crown region (Cr), therefore, the stability performance during the full-bank running is improved while the ground contacting feeling during run-ning is maintained high. From such a point of view, it is preferred that the land ratio of the crown region (Cr) is in the range of from 65% to 75%.

In order to improve the transient characteristics, it is preferred that the land ratio of the tread portion 2 gradually increases from the side of the tyre equator (c) to the side of each of the tread edges (Te).

The tread portion 2 in this embodiment is provided with grooves 19. The grooves 19 in this embodiment include a longitudinal groove 20 extending in the tyre circumferential direction and lateral grooves 21 extending in the tyre axial direction.

The longitudinal groove 20 in this embodiment extends continuously on the tyre equator in a zigzag manner. The longitudinal groove 20 configured as such discharges a large amount of water film between the road surface in the vicinity of the tyre equator (c) and the ground contacting surface (2a), therefore, it is possible that drainage performance is improved. The longitudinal groove 20 is not limited to such an embodiment, and it may be configured to extend straight or configured as a closed-type groove that terminates in the tyre circumferential direction.

In this embodiment, a plurality of the lateral grooves 21 are provided on both sides in the tyre axial direction of the longitudinal groove 20. Each of the lateral grooves 21 in this embodiment is arranged with a space between the longitudinal groove 20. Thereby, large decrease in the rigidity of the tread portion 2 is suppressed. The lateral grooves 21 are inclined with respect to the tyre circumferential direction, for example. The lateral grooves 21 are not limited to such an embodiment, and they may be configured to be connected with the longitudinal groove 20 or configured to extend along the tyre axial direction, for example.

The lateral grooves 21 include first lateral grooves 22 each having both ends terminating within the ground contacting surface (2a) of the tread portion 2 and second lateral grooves 23 each having a length in the tyre axial direction larger than that of each of the first lateral grooves 22, for example. The first lateral grooves 22 and the second lateral grooves 23 in this embodiment are arranged alternately in the tyre circumferential direction.

An inner end (22i) in the tyre axial direction of each of the first lateral grooves 22 is arranged on the side of a respective one of the tread edges (Te) of an inner end (23i) in the tyre axial direction of each of the second lateral grooves 23. The first lateral grooves 22 configured as such are helpful for maintaining the land ratio of the crown region (Cr) high.

As shown in FIG. 2, each of the second lateral grooves 23 in this embodiment extends so as to intersect with a respective one of the connecting portions 9. That is, each of the spaces 11 is formed by a respective one of the second lateral grooves 23. As just described, the spaces 11 are formed by the second lateral grooves 23, therefore, excessive increase in the rigidity of the regions of the tyre on the sides of the tread edges is effectively suppressed. Thereby, the ground contacting feeling is maintained high, therefore, the stability performance during the full-bank running is improved. Further, it is possible that the water in the second lateral grooves 23 is easily discharged to the outside of the tread edges (Te) without being obstructed by the protruding portions 10, therefore, the drainage performance during the full-bank running is maintained high. From such a point of view, it is further preferred that an outer end (23e) of each of the second lateral grooves 23 and a respective one of the spaces 11 are arranged so as to overlap each other without being misaligned in the tyre circumferential direction.

It is preferred that a groove cross-sectional area in the tyre circumferential direction at the outer end (23e) in the tyre axial direction of each of the second lateral grooves 23 is in the range of from 10 to 30 sq. mm. If the groove cross-sectional area at the outer end (23e) of each of the second lateral grooves 23 is less than 10 sq. mm, the deformation of the shoulder regions (sh) becomes small, therefore, it is possible that the ground contacting feeling is deteriorated. If the groove cross-sectional area at the outer end (23e) of each of the second lateral grooves 23 is more than 30 sq. mm, the rigidity of the shoulder regions (sh) is excessively decreased, therefore, it is possible that the reaction force fed back to the rider becomes small. The outer end (23e) in the tyre axial direction of each of the second lateral grooves 23 coincides in the tyre axial direction with the inner end (10i) of the outer surface (10a).

While detailed description has been made of the tyre as an embodiment of the present invention, the present invention can be embodied in various forms without being limited to the illustrated embodiment.

WORKING EXAMPLES (EXAMPLES)

Tyres for a motorcycle having the basic structure of FIG. 1 and the tread pattern of FIG. 5 were made by way of test according to the specifications listed in Table 1, and each of the test tyres was tested for the transient characteristics and the stability performance during the full-bank running. Note that the common specifications were as follows.

Tyre size:
Front wheel: 120/70ZR17
Rear wheel: 160/60ZR17
Tyre rim size:
Front wheel: MT3.50×17
Rear wheel: MT4.50×17
Tyre inner pressure:
Front wheel: 225 kPa
Rear wheel: 250 kPa The test method was as follows.

<Transient Characteristics and Stability Performance During Full-Bank Running>

Each of the test tyres was mounted on a rear wheel of a motorcycle with a displacement of 400 cc and was driven on a test course having a dry asphalt road surface, and then the "transient characteristics" and the "stability performance during full-bunk running" were evaluated by the test rider's feeling. The results are indicated by an evaluation point based on Reference 1 being 100, wherein a larger numerical value is better.

The test results are shown in Table 1.

TABLE 1

| | | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|---|
| Presence (P) or Absence (A) of Protruding portion | | A | P | P | P | P | P | P | P | P | P | P | P |
| Presence (P) or Absence (A) of Space | | — | A | P | P | P | P | P | P | P | P | P | P |
| Length (La) of Space/Maximum length (Lm) of Foot print | [%] | — | — | 6 | 12 | 6 | 6 | 6 | 6 | 6 | 6 | 6 | 6 |
| Groove cross-sectional area of Second lateral groove | [sq. mm] | 20 | 20 | 20 | 20 | 5 | 10 | 30 | 35 | 20 | 20 | 20 | 20 |
| Land ratio of Crown region | [%] | 70 | 70 | 70 | 70 | 70 | 70 | 70 | 70 | 60 | 80 | 70 | 70 |
| Land ratio of Shoulder region | [%] | 75 | 75 | 75 | 75 | 75 | 75 | 75 | 75 | 75 | 65 | 75 | 75 |
| Width (w) of Protruding portion | [mm] | — | 1.5 | 1.5 | 1.5 | 1.5 | 1.5 | 1.5 | 1.5 | 1.5 | 1.5 | 0.5 | 2.5 |
| Height (h) of Protruding portion | [mm] | — | 1.5 | 1.5 | 1.5 | 1.5 | 1.5 | 1.5 | 1.5 | 1.5 | 1.5 | 0.5 | 2.5 |
| Transient characteristics | [evaluation point: larger is better] | 100 | 90 | 115 | 110 | 105 | 110 | 110 | 105 | 115 | 110 | 105 | 100 |
| Stability performance during full-bank running | [evaluation point: larger is better] | 100 | 110 | 125 | 110 | 115 | 120 | 120 | 115 | 120 | 115 | 110 | 110 |

From the test results, it was confirmed that both of the transient characteristics and the stability performance during full-bank running were improved for the tyres as Examples. Further, the same tests were carried out on tyres for a motorcycle having different tyre sizes and tread patterns, but similar results were obtained.

The invention claimed is:

1. A tyre for a motorcycle comprising a tread portion and a pair of sidewall portions connected with both ends of the tread portion and extending inwardly in a tyre radial direction, wherein
   a connecting portion of the tread portion and at least one of the pair of the sidewall portions is provided with a plurality of protruding portions each protruding outwardly in a tyre axial direction beyond an adjacent portion of a ground contacting surface of the tread portion,
   the plurality of the protruding portions is arranged in a tyre circumferential direction with a space between each other,
   a tread width of the tyre is a distance between tread edges in the tyre axial direction and is a maximum width of the tyre,
   a length in the tyre circumferential direction of each space is less than 10% of a maximum length of a foot print when the tyre is mounted on a standard rim, inflated to a standard inner pressure, and in contact with a flat surface with a camber angle of 45 degrees by being loaded with a standard tyre load,
   each of the protruding portions has a rib shape elongated in the tyre circumferential direction, is formed over the entire distance between the spaces adjacent to each other, and has a circumferential length longer than each space; and
   each of the protruding portions has a radially outer surface extending separately from the adjacent portion of the ground contacting surface of the tread portion, and a radially inner surface opposing the radially outer surface, the radially inner surface extending separately from one of the at least one of the sidewall portions.

2. The tyre for a motorcycle according to claim 1, wherein the tread portion is provided with grooves each extending so as to intersect with the connecting portion.

3. The tyre for a motorcycle according to claim 2, wherein each space is formed by a respective one of the grooves.

4. The tyre for a motorcycle according to claim 2, wherein a cross-sectional area of each of the grooves at a position of the connecting portion is in a range of from 10 to 30 sq. mm.

5. The tyre for a motorcycle according to claim 1, wherein the length in the tyre circumferential direction of each space is in a range of from 3 to 10 mm.

6. The tyre for a motorcycle according to claim 1 wherein when a tread development width is divided equally into four, the tread portion includes a pair of shoulder regions positioned on both ends, and
a land ratio of each of the shoulder regions is not less than 70%.

7. The tyre for a motorcycle according to claim 6, wherein the tread portion includes a crown region defined between the pair of the shoulder regions, and
the land ratio of each of the shoulder regions is larger than the land ratio of the crown region.

8. The tyre for a motorcycle according to claim 1, wherein the space is provided over the entire length of the protruding portions so as to communicate with the tread portion and the sidewall portion.

9. The tyre for a motorcycle according to claim 1, wherein each of the protruding portions includes an axially outward facing surface connecting between the radially outer surface and the radially inner surface, and
an axially outer end of the radially outer surface forms a respective one of the tread edges.

10. The tyre for a motorcycle according to claim 9, wherein,
in a cross-sectional view of each of the protruding portions, the radially outer surface, the radially inner surface, and the axially outward facing surface are formed in a straight shape.

11. The tyre for a motorcycle according to claim 1, wherein
a radial height of each of the protruding portions is 1 mm or more and 2 mm or less.

12. The tyre for a motorcycle according to claim 11, wherein
an axial width of each of the protruding portions is 1 mm or more and 2 mm or less.

13. The tyre for a motorcycle according to claim 12, wherein
a circumferential length of each of the protruding portions is 20 mm or more and 100 mm or less.

14. The tyre for a motorcycle according to claim 9, wherein
the radially outer surface is connected with a main portion of a ground contacting surface of the tread portion configured to be smoothly convex radially outward with a first arc portion that is convex radially inward therebetween, and
the radially inner surface is connected with a main portion of an outer surface of the at least one of the sidewall portions extending smoothly in the tyre radial direction with a second arc portion that is convex radially outward therebetween.

15. The tyre for a motorcycle according to claim 14, wherein
a radius of curvature of the second arc portion is larger than a radius of curvature of the first arc portion.

16. The tyre for a motorcycle according to claim 15, wherein
the radius of curvature of the first arc portion is not more than 2 mm, and
the radius of curvature of the second arc portion is 3 mm or more and 5 mm or less.

17. The tyre for a motorcycle according to claim 2, wherein
the tread portion is provided with other grooves, and
each of the other grooves has both ends terminating within a ground contacting surface of the tread portion without intersecting the connecting portion.

18. The tyre for a motorcycle according to claim 17, wherein
axially inner ends of the grooves are arranged closer to a tyre equator than are axially inner ends of the other grooves.

19. The tyre for a motorcycle according to claim 18, wherein the grooves and the other grooves are arranged alternately in the tyre circumferential direction.

* * * * *